(12) United States Patent
Lang et al.

(10) Patent No.: US 9,849,823 B2
(45) Date of Patent: Dec. 26, 2017

(54) INDICATOR UNIT FOR A SYSTEM FOR INDIRECT VISION OF A VEHICLE AND SYSTEM FOR INDIRECT VISION COMPRISING AN INDICATOR UNIT

(71) Applicants: Werner Lang, Ergersheim (DE); Elmar Finkenberger, Adelshofen (DE); Andreas Redlingshöfer, Trautskirchen (DE)

(72) Inventors: Werner Lang, Ergersheim (DE); Elmar Finkenberger, Adelshofen (DE); Andreas Redlingshöfer, Trautskirchen (DE)

(73) Assignee: MEKRA LANG GMBH & CO. KG, Ergersheim (DE)

(*) Notice: Subject to any disclaimer, the term of this patent is extended or adjusted under 35 U.S.C. 154(b) by 79 days.

(21) Appl. No.: 14/682,908

(22) Filed: Apr. 9, 2015

(65) Prior Publication Data

US 2015/0291080 A1    Oct. 15, 2015

(30) Foreign Application Priority Data

Apr. 9, 2014    (DE) .................. 10 2014 005 610

(51) Int. Cl.
| | | |
|---|---|---|
| *B60Q 1/26* | (2006.01) | |
| *B60Q 1/00* | (2006.01) | |
| *B60Q 1/38* | (2006.01) | |
| *F21S 8/10* | (2006.01) | |

(52) U.S. Cl.
CPC ............ *B60Q 1/00* (2013.01); *B60Q 1/0017* (2013.01); *B60Q 1/0023* (2013.01); *B60Q 1/2665* (2013.01); *B60Q 1/38* (2013.01); *F21S 48/211* (2013.01); *F21S 48/215* (2013.01); *F21S 48/2237* (2013.01); *F21S 48/2281* (2013.01); *F21S 48/328* (2013.01)

(58) Field of Classification Search
CPC ................... G08B 13/2477; G08B 13/2488; G08B 29/22; B60Q 1/00; B60Q 1/0017; B60Q 1/0023; F21S 48/211; F21S 48/215; F21S 48/2237; F21S 48/2281
USPC .................. 340/572.1, 10.1, 568.1, 571, 468
See application file for complete search history.

(56) References Cited

U.S. PATENT DOCUMENTS

| | | | | |
|---|---|---|---|---|
| 5,151,824 | A * | 9/1992 | O'Farrell | B60R 1/02 359/514 |
| 5,938,320 | A * | 8/1999 | Crandall | B60Q 1/2665 362/140 |
| 6,276,821 | B1 * | 8/2001 | Pastrick | B60Q 1/2665 362/141 |
| 6,416,208 | B2 | 7/2002 | Pastrick et al. | |

(Continued)

FOREIGN PATENT DOCUMENTS

| | | |
|---|---|---|
| DE | 102 27 720 A1 | 1/2004 |
| DE | 102 38 073 A1 | 3/2004 |

(Continued)

*Primary Examiner* — Eric M Blount
(74) *Attorney, Agent, or Firm* — Cozen O'Connor

(57) ABSTRACT

An indicator unit for a system for indirect vision of a vehicle. A unit has a functional unit housing having at least one electronic carrier accommodated therein. The at least one electronic carrier has at least one first electric or electronic functional component for providing the function of a direction indicator, and a second electric or electronic functional component.

35 Claims, 4 Drawing Sheets

(56) References Cited

U.S. PATENT DOCUMENTS

| | | | |
|---|---|---|---|
| 7,080,913 B2 * | 7/2006 | Henion | B60Q 1/2665 340/475 |
| 7,427,150 B2 * | 9/2008 | Carter | B60Q 1/2665 359/515 |
| 7,581,859 B2 * | 9/2009 | Lynam | B60Q 1/2665 362/494 |
| 8,449,158 B2 * | 5/2013 | Pastrick | B60Q 1/2665 362/494 |
| 8,491,170 B2 * | 7/2013 | Rodriguez Barros | B60Q 1/2665 362/494 |
| 2006/0262550 A1 | 11/2006 | Pastrick et al. | |
| 2011/0001428 A1 * | 1/2011 | Rodriguez Barros | B60Q 1/2665 315/77 |

FOREIGN PATENT DOCUMENTS

| | | |
|---|---|---|
| DE | 699 20 330 | 10/2005 |
| DE | 601 19 122 T2 | 12/2006 |
| DE | 10 2009 058 457 A1 | 6/2011 |

* cited by examiner

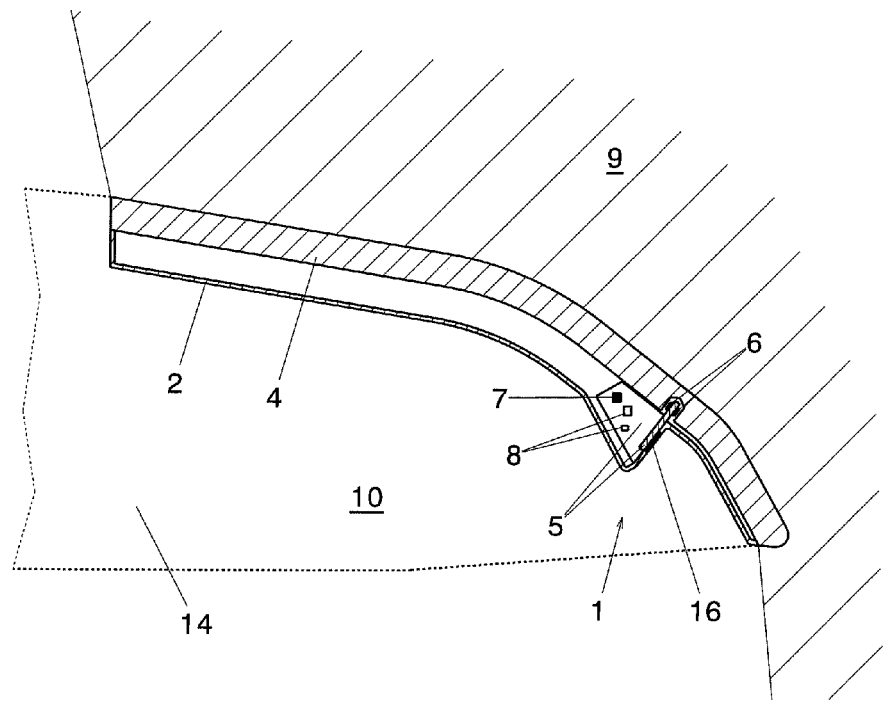
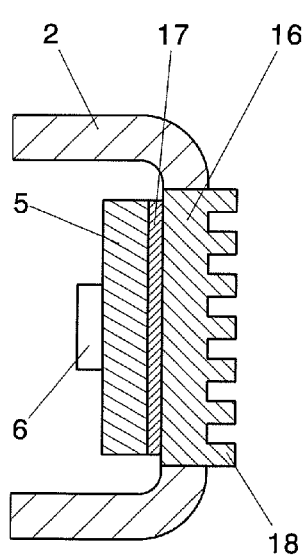
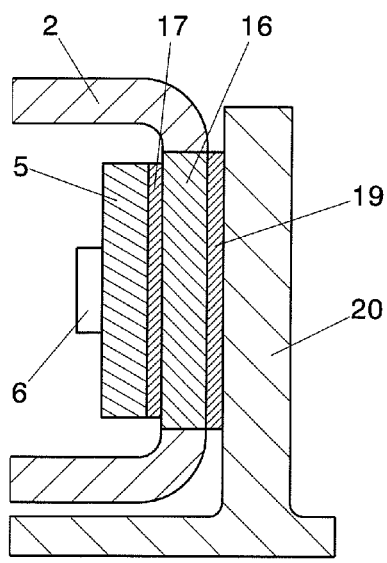

INDICATOR UNIT FOR A SYSTEM FOR INDIRECT VISION OF A VEHICLE AND SYSTEM FOR INDIRECT VISION COMPRISING AN INDICATOR UNIT

BACKGROUND OF THE INVENTION

1. Field of the Invention

The present invention relates to an indicator unit for a system for indirect vision of a vehicle, as well as to a system for indirect vision comprising said indicator unit.

2. Description of the Related Art

Systems for indirect vision may be mirroring systems like exterior mirrors or side mirrors of a vehicle, but also camera arms that, similar to vehicle side mirrors, comprise a camera module instead of a mirror surface, which camera module captures corresponding fields of vision in the vehicle environment and displays the same within the vehicle at suitable positions visible for the driver. These camera arms may have a similar design and housing as side mirrors, and may be mounted to the vehicle at a similar position.

The system for indirect vision usually comprises a housing wherein, besides the actual system for indirect vision, also other functional modules may be integrated as functional module. For example, a direction indicator may be integrated in the housing of the system for indirect vision. Besides the legally prescribed portion at the mirror where the flashing signal is visible, or a region around the vehicle where the flashing signal should be recognizable, this kind of direction indicator or indicator at the side mirror often also comprises further regions at the mirror where the flashing signal is visible and, thus, safety of road users is increased as the intentions of a driver are more comprehensible. Distribution of the light signal along an outer contour of the mirror is often achieved by providing optical guides coupled to a light source.

It is known to design the indicator unit or direction indicator unit as a functional unit with a separate housing, and to integrate the same into the housing of the system for indirect vision. A further functional component unit as, for example, other environment lights, temperature sensors, camera modules, or antennas, may be additionally integrated in the housing of the system for indirect vision; usually, however, it is integrated into the housing of the system by means of an own, separate functional unit housing, and not accommodated in the housing of the indicator or direction indicator.

When the indicator unit is provided with a light source and an associated optical guide, the optical guide may simultaneously form the outer surface of the indicator unit housing, or the indicator unit may be provided with a light source and an optical guide, the optical guide being located behind a lens forming a transparent outer surface of the housing. In this case, the transparent outer surface, i.e. the lens, forms an outer surface of the indicator unit housing.

DE 102 38 073 A1 discloses a vehicle light, in particular a side indicator light, for installation in the housing of an external mirror. The vehicle light comprises at least one optical guide arranged within the light housing, which optical guide extends from the outer edge of the external mirror housing and substantially horizontally towards the vehicle, and guides the light inserted at its end face on the vehicle side from at least one light source to its opposed end face, where the light is emitted substantially opposed and transverse to the vehicle driving direction to meet the legally prescribed requirements with regard to light distribution. Further, a second light source is provided, which is associated with at least one optical component serving as a second optical guide that is substantially arranged behind the first optical guide and emits the light inserted from its end face on the vehicle side substantially transverse to its longitudinal extension by means of output coupling elements. The light de-coupled by the second optical guide radiates through the first optical guide.

DE 601 19 122 T2 relates to a vehicle external mirror having a plurality of exchangeable signals for vehicles having two, three, four, or more wheels.

Consequently, it is an object of the invention to provide an indicator unit for a system for indirect vision of a vehicle, by means of which indicator unit further functional units may be easily integrated in the system for indirect vision. Further, it is an object of the invention to provide a corresponding system for indirect vision comprising an indicator unit that is easily integrated therein, as well as further functional units.

SUMMARY OF THE INVENTION

An indicator unit is provided where at least one further functional unit is accommodated in the single housing, through which also the light to be generated by the indicator unit emits, so that, when the indicator unit is integrated in the system for indirect vision, the further functional unit may be simultaneously integrated into the system for indirect vision. Here, the term 'functional unit' includes any assembly that can provide a function required in the vehicle, e.g. additional environment lights for the vehicle, a temperature sensor, a camera module, antennas that are, for example, suitable for the locking system, a heating module or the like. The functions of these functional units are usually provided by so-called active electric or electronic functional components, wherein an active functional component is a component which has, in any form, an enhancing effect on the wanted signal, or allows a control, e.g. diodes, transistors, optical couplers, or a relay. The function of the functional unit may, however, also be provided by a passive component. Passive components are components that do not show any enhancing effect and do not have any control function, e.g. resistors, capacitors, inductances, and memristors.

In any case, the term 'functional unit' is used for every unit that provides a function, e.g. a visual or acoustic display, to the outside, i.e., in the mounted state, to the vehicle environment or to the surroundings of the indicator unit housing, or that receives information and/or data from the outside, e.g. temperature sensors, distance sensors, antennas, or a camera, in order to provide the same in the vehicle for further processing. A function like heating by means of a heating board, which only internally effects the components accommodated within the indicator unit housing or mirror housing, is, therefore, not included in the term "functional unit". The functional component is the component, e.g. of an assembly comprised of a plurality of electrical or electronic components, which substantially generates the function, e.g. a lamp or light for the indicator unit.

According to an embodiment of the invention, an indicator unit is provided for a system for indirect vision of a vehicle, which indicator unit comprises in a functional unit housing where the indicator unit is integrated at least one electronic carrier accommodated therein and formed, for example, as printed circuit board, the at least one electronic carrier comprising at least one first electrical or electronic functional component responsible for the indicator function, and a second electrical or electronic functional component that provides a further function. This further function may be any function except for an indicator function. Preferably, this further function is no illuminating function either, but any kind of non-illuminating function. The first electrical or electronic functional component and the second electrical or electronic component are provided in the common functional unit housing of the indicator unit, i.e. in the housing through which also the light of the indicator unit escapes to the environment, more preferably in a common installation space that is not divided by structural components; the functional components may be provided on a common electronic carrier or on separate electronic carriers. The first and/or second electrical or electronic components may preferably be active electrical or electronic components.

With regard to a compact spatial arrangement, it is advantageous to use a common electronic carrier for the first functional component and the second functional component as the functional components may additionally be arranged on the electronic carrier dependent on the location of the functional units and their integration in the functional unit housing of the indicator unit, so that an optimum spatial arrangement both of the functional units, including the indicator unit, and the functional components generating the associated functions, is ensured in the functional unit housing. Advantageously, if the second function is an additional lighting, both the indicator unit and the additional lighting unit may be arranged in the outer region of the functional unit housing, and the associated circuit elements or functional components may be correspondingly arranged on the electronic carrier.

Integrating at least one further function to the indicator unit and in the indicator unit housing may result in a cost reduction, in particular with respect to installation of the indicator unit and the further functional units on the vehicle and, in particular, the system for indirect vision, and the installation space required for the functional units may be reduced in size.

Here, the electronic carrier, e.g. the printed circuit board, accommodates the active and/or passive functional components and, if necessary, further components of the functional units, including the indicator unit. The indicator unit requires, for example, a light source as a functional component, e.g. an LED, light bulb, OLED, light tube, etc. The further functional components require components like LEDs, sensors, etc.

Additionally, a circuit that distributes electrical power is integrated on the electronic carrier. For this purpose, passive electrical or electronic components, e.g. resistors, may be provided. However, these components do not provide any substantial function to the outside.

According to a particularly preferred embodiment, further functional components, i.e. active or passive electrical or electronic components, may be provided in addition to the first and second electrical or electronic functional components. By doing so, further functions may be compactly integrated in the functional unit housing of the indicator unit, in addition to the indicator function and the one additional function.

According to a preferred embodiment, further passive electrical components are provided on the electronic carrier, e.g. for distributing the power. These components may, for example, be applied to the circuit board or the electronic carrier in the form of printed circuits. The term 'circuit board' means a circuit board that serves as a carrier for electronic components. Besides the mechanical fixing, the circuit board also serves for the electrical connection. It is preferably made of electrically insulating material with adhering, conductive connections.

According to another preferred embodiment, the first electric or electronic functional component comprises a light source, e.g. an LED, light bulb, OLED, light tube etc., which is coupled to an optical guide, so that light from the light bulb may be supplied to the optical guide. The optical guide transmits the light to the desired locations along the functional unit housing and emits the light signal of the indicator or direction indicator to the environment.

The optical guide may form part of the outer surface of the functional unit housing, or it may be integrated within the functional unit housing; in the latter case, the functional unit housing is additionally provided with a lens, which preferably forms part of the surface of the functional unit housing, through which surface the optical guide emits light to the environment.

Further, if required, at least one light deflecting component or light diffusing component may be provided coupled to the light source and/or the optical guide, in order to direct and scatter the light emitted from the indicator unit, if necessary, so that the legal requirements for illuminated regions of the direction indicator are met, and light is visible from the environment. A light deflecting component or scattering component may also be provided for feeding the light into an optical guide.

According to a further preferred embodiment, the functional unit housing may be provided with an opening, through which opening a functional device may be connected to the second functional component, e.g. a temperature sensor exposed to the environment may be connected to the corresponding control element as a functional component, or through which opening a camera serving as a second functional unit may capture images of the environment. The opening may be designed such that dust and/or water are prevented from entering the functional unit housing.

The functional unit housing itself may be designed as a closed housing, which is preferably dust-proof and/or waterproof. This facilitates installation at a system housing of the system for indirect vision, as no sealing requirements have to be met; it is sufficient to simply mechanically fix the indicator unit to the system housing of the system for indirect vision.

Alternatively, the indicator unit may be provided with an open housing, so that, when attaching the indicator unit to the system housing of the system for indirect vision, the functional unit housing of the indicator unit forms a closed housing by abutment with a surface of the system housing. In this case it is, however, often necessary to provide a sealing to the surface of the system housing when attaching the functional unit housing of the indicator unit, in order to form a preferably dust-proof and/or waterproof installation space wherein the electronic carrier with the affixed active functional components and passive components are provided.

According to a particularly preferred embodiment, which may also be used for other indicator units, the functional unit housing is designed such that it comprises at least one portion made of a material with high thermal conductivity. The term 'material with high thermal conductivity' means a material having a thermal conductivity that is at least in the range of metallic material, i.e., for example, a thermal conductivity greater than or equal to 0.8 W/(cm·K) (at 27° C.).

Particularly preferably, the portion made of a material with high thermal conductivity is made of metal.

Preferably, the portion made of a material with high thermal conductivity is positioned adjacent to or in close proximity to the electronic carrier.

By providing a portion with high thermal conductivity in the functional unit housing, it is possible to ensure good heat dissipation of the heat generated by the electronic carrier provided with the first and second electrical or electronic functional components, which components possibly generate substantial heat, so that the heat generated by these electrical or electronic components is reliably dissipated to the environment. This is of special importance as, by additionally providing a second electrical or electronic functional component in the functional unit housing, a heat amount to be dissipated may be increased, and the components may, thus, be protected from failure due to overheating.

According to a particularly preferred embodiment, the portion with high thermal conductivity is in direct and close abutment with the electronic carrier, i.e. contacts the electronic carrier. Consequently, heat dissipation to the environment of the functional unit housing is particularly effective.

Alternatively, an additional thermally conductive pad is positioned between the electronic carrier and the functional unit housing, in particular the portion with high thermal conductivity, said thermally conductive pad being in direct contact with both the electronic carrier and the portion of the functional unit housing that is made of a material with high thermal conductivity. The thermally conductive pad may be a suitable adhesive or another layer with high thermal conductivity. High thermal conductivity means a thermal conductivity that is equal to or greater than that of the portion with high thermal conductivity as defined above. By interposing a thermally conductive pad between the electronic carrier and the portion made of a material with high thermal conductivity, the heat generated by the functional components provided on the electronic carrier within the functional unit housing may be easily dissipated to the environment of the functional unit housing.

According to another preferred embodiment, the portion made of a material with high thermal conductivity is provided with an additional heat dissipating structure at the side corresponding to the outside of the functional unit housing. This heat dissipating structure may be provided in the form of cooling fins, or in the form of a further heat conductive pad of particularly high heat conductivity, which may be provided directly adjacent to a projecting or fastening structure for the functional unit housing at the system housing of the system for indirect vision. By providing such heat dissipating structure, the efficiency of heat dissipation to the environment of the functional unit housing may be improved.

Preferably, the system for indirect vision is a mirroring system, e.g. a vehicle side mirror, or a camera system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described by means of the attached Figures, in which:

FIG. 7 shows a further embodiment of the indicator unit according to the invention;

FIG. 8 shows a detailed view of a heat conducting structure for an indicator unit according to FIG. 7; and FIG. 9 shows an alternative embodiment of a heat conducting structure for an indicator unit according to FIG. 7.

DETAILED DESCRIPTION OF THE PRESENTLY PREFERRED EMBODIMENTS

Figure 1:
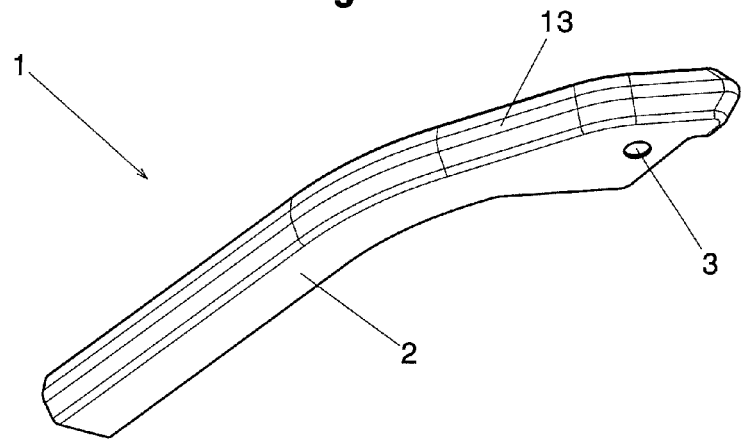
FIG. 1 is a perspective view of an indicator unit according to the invention.

FIG. 1 is a perspective view of an indicator unit 1 according to the invention. The indicator unit 1 is provided with a functional unit housing 2 (indicator housing). Light generated by the indicator unit may be emitted to the vehicle environment through part of the outer surface of functional unit housing 2 or along its entire surface.

Figure 2:
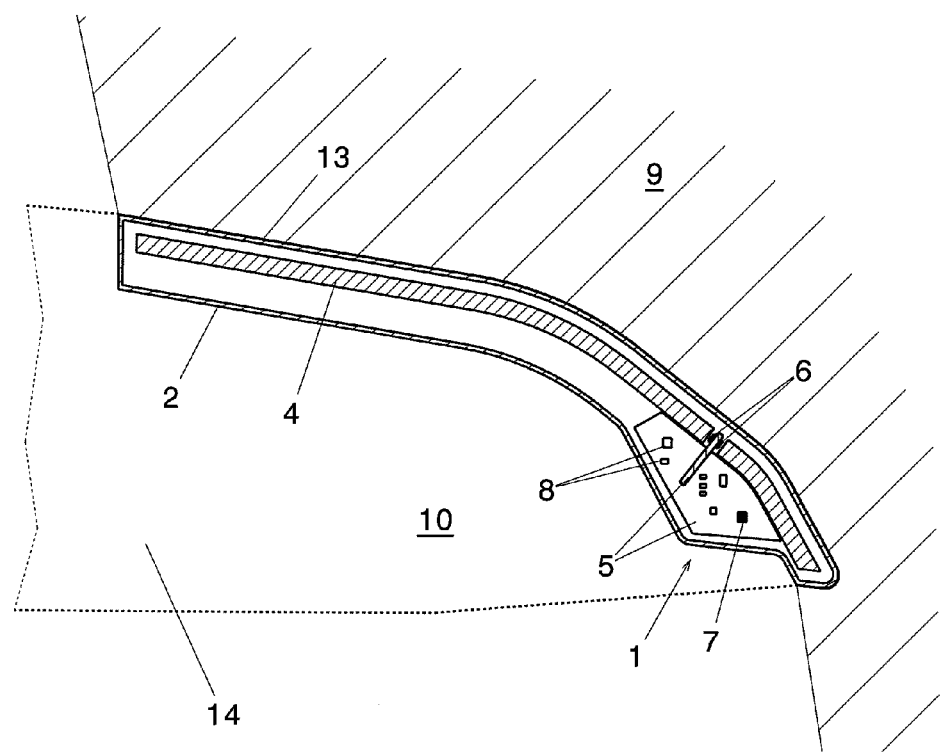
FIG. 2 schematically shows the integration of the indicator unit of FIG. 1 in a system housing of a system for indirect vision, as well as an indicator segment of the indicator unit.

For this reason, in the embodiment of the indicator unit shown in FIGS. 1 and 2, at least part of the functional unit housing 2 is provided with a translucent lens 13. Alternatively, the entire functional unit housing 2, or at least the part of the functional unit housing 2 that is exposed to the vehicle environment after installation in a system housing of a system for indirect vision, may be a translucent, transparent lens 13.

Figure 5:
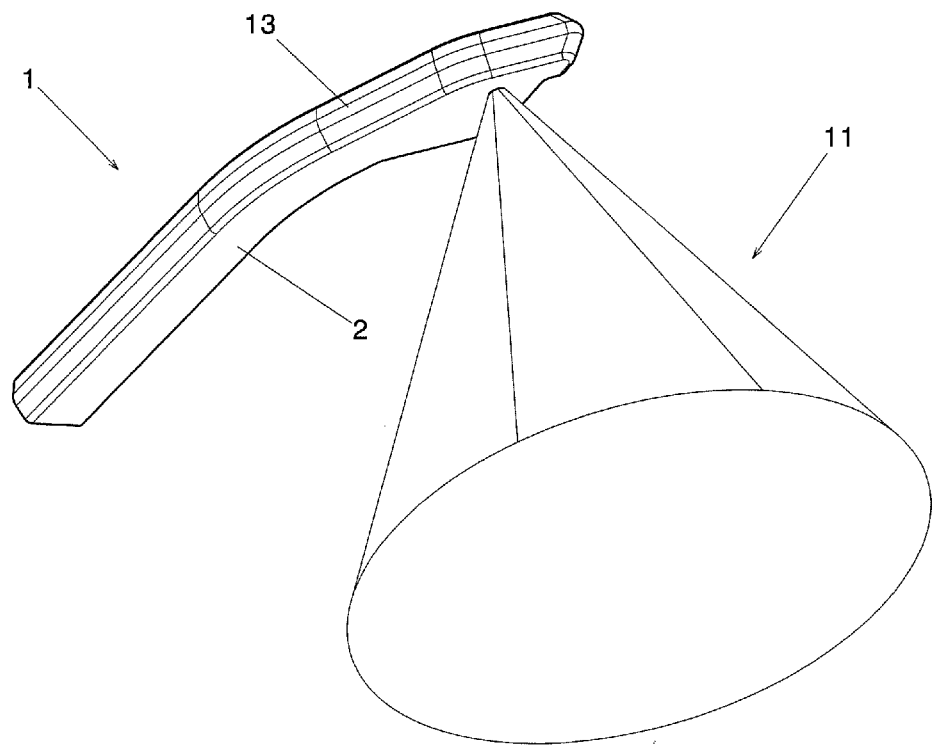
FIG. 5 shows a perspective view of a cone of view of a further functional component, i.e. a camera, from the indicator unit.

The functional unit housing 2 shown in FIG. 1 is further provided with a functional opening 3. Through this functional opening, a connection with the environment can be established, whereas the functional unit housing 2 is otherwise closed in the mounted state, so that e.g. a temperature sensor may measure the environment temperature through functional opening 3, or a camera integrated in the functional unit housing 2 may capture images through functional opening 3, so that, as shown e.g. in FIG. 5, a cone of view 11 of the camera extends through functional opening 3. If e.g. an acoustic signal is emitted to the outside through the functional opening 3, the cone illustrated in FIG. 5 corresponds to a sound propagation cone; in case of an illumination, it corresponds to a light cone etc.

As can be seen best in FIG. 2, in the illustrated embodiment, the functional unit housing 2 forms a closed housing in the mounted state, i.e. the functional unit housing 2 may be dust-proof and waterproof. Thereby, the components accommodated in the functional unit housing 2 are protected. Consequently, when the functional unit housing 2 is mounted to the system housing 14 of a system 10 for indirect vision, as indicated in FIG. 2, only a simple mechanical and electrical connection is required for supporting the electrical components or connecting them to the vehicle energy supply and vehicle control. It is, however, not necessary to provide any seal for sealing the functional unit housing 2 with regard to the surrounding outer surface 14 of the system 10 for indirect vision.

In the functional unit housing 2 which, in the embodiment shown in FIG. 2, comprises a lens 13 through which the light generated by the indicator unit is emitted to the indicator segment 9, two elongated optical guides 4 extending along a longitudinal direction of a reception portion in the system housing 14 of the system for indirect vision, two electronic carriers 5, and a plurality of active and passive electrical components 6, 7, 8 provided on the electronic carrier 5, are inserted. The elongated optical guide 4 substantially extends along the outer surface of the functional unit housing 2, through which light is emitted to the environment.

In the illustrated embodiment, an electronic carrier 5, i.e. a printed circuit board, is provided, to which a light source constituting a first active electronic functional component 6 is mounted to provide the indicator function. The light source may be an LED, a light bulb, or an OLED. The light source is arranged on the electronic carrier 5 such that it feeds light into the optical guides in a longitudinal direction at an end face thereof. The light may be emitted at an opposed end face of the optical guides 4 and/or along their longitudinal direction.

A further printed circuit board 5 is provided with a second active electronic functional component 7, as illustrated in FIG. 2. This electronic functional component 7 may, for example, be an antenna, a control for an environment light, a camera module, a heating module, or the like. Instead of the first and second active functional components 6, 7, one or both functional components 6, 7 may be formed as passive electrical or electronic components, if required.

Additionally, further passive electric components 8 are provided on the two printed circuit boards 5. These passive electric components 8 mainly serve for distributing power on the electronic carrier 5 to the first and second electrical or electronic functional component 6, 7.

Instead of the two electronic carriers 5 illustrated in FIG. 2, a single electronic carrier 5 may be provided, and the first and second active electrical or electronic components may be arranged on this common electronic carrier 5.

At adequate power supply via the circuit, e.g. printed circuit, on the electronic carrier 5, the light source constituting the first electronic functional component 6 is activated and light is fed into the optical guide 4. The light fed into the optical guide 4 is then emitted along the optical guide through lens 13 of functional unit housing 2, at coupling positions for the light, along the entire optical guide 4 or part of the optical guide 4, to the environment for illuminating the indicator segment 9.

Figure 3:
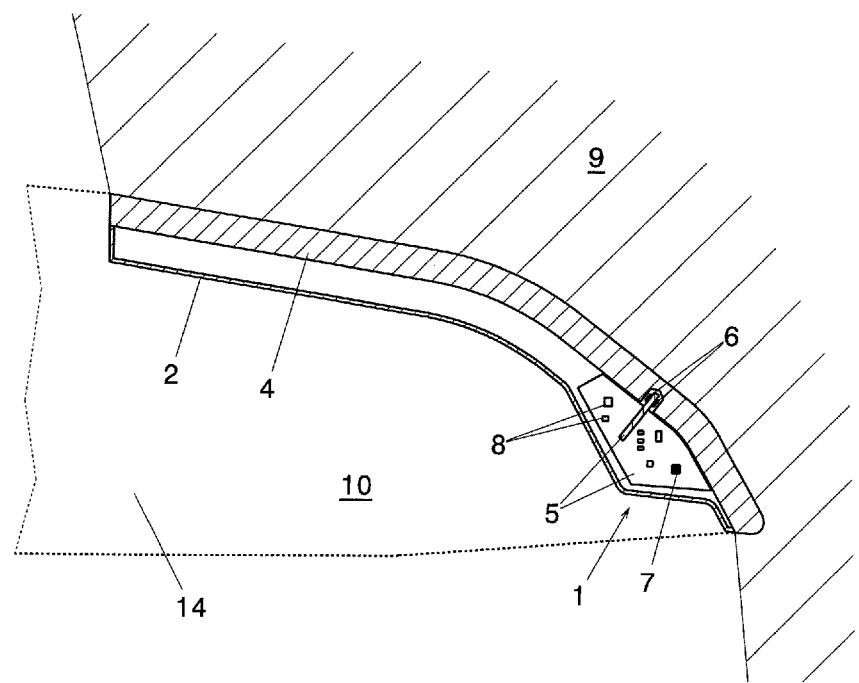
FIG. 3 shows a further embodiment of the indicator unit according to the invention, in a view corresponding to FIG. 2.

FIG. 3 shows an alternative embodiment of the indicator unit 1 illustrated in FIG. 2. The indicator unit 1 shown in FIG. 3 differs from the previously described indicator unit in that only a single optical guide 4 is provided, wherein said optical guide 4 forms part of the outer surface of the functional unit housing 2 and, consequently, in contrast to FIG. 2, no lens 13 is provided. Correspondingly, the electronic carrier 5 on which the first electrical functional component is provided, which functional component serves for generating the light for the indicator function, extends into the optical guide. This optical guide is, however, not divided in two optical guides as shown in FIG. 2, but merely comprises a hollow space for accommodating the electronic carrier 5 provided with the light serving as the first active electronic functional component 6. That is, at the light coupling point, the optical guide 4 is modified in its cross-section by forming a recess, so that light may be optimally introduced into the optical guide 4. The further components and embodiments, as well as the function, correspond to the embodiment described in FIG. 2 and a description thereof is, therefore, omitted.

Figure 6:
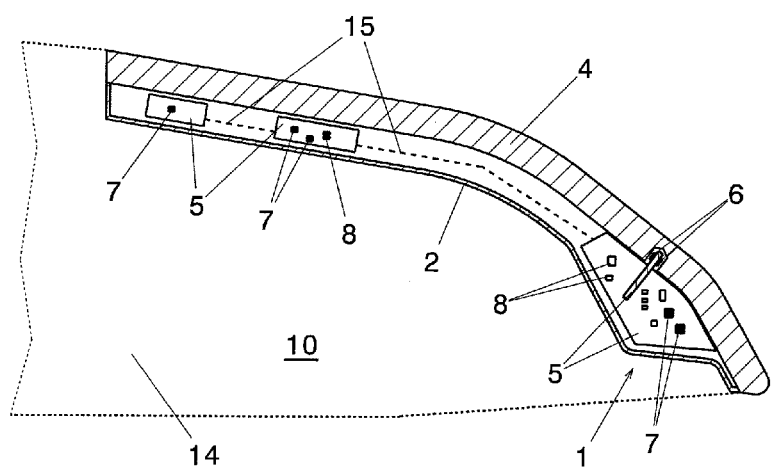
FIG. 6 shows yet another embodiment of the indicator unit according to the invention, in a view corresponding to FIG. 2.

Moreover, as shown in the embodiment of FIG. 6, further electronic carriers 5 (in FIG. 6 two additional electronic carriers 5) may be provided, on which functional components 7 and/or other electrical or electronic components 8 are provided. The functional components 7 may be formed for providing the same function or for providing different functions. The electronic carriers 5 are connected via adequate conductors 15. The functional components 7 of the further electronic carriers are arranged at positions in the immediate surrounding of where the respective function is to be provided, e.g. where a temperature has to be measured.

Figure 4:
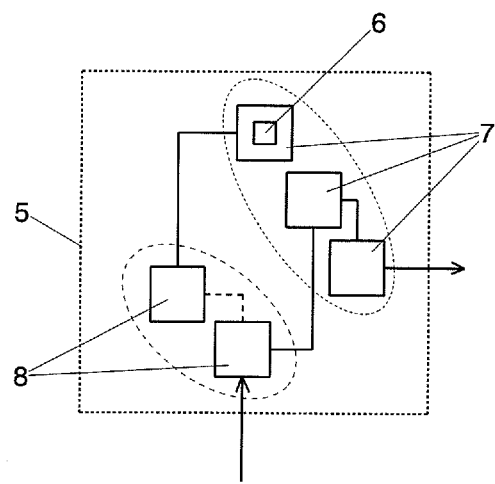
FIG. 4 schematically shows an electronic carrier of the indicator unit according to the invention.

FIG. 4 schematically shows an electronic carrier 5 having functional components 6, 7 arranged thereon, and provided with electrical components 8 and a printed circuit.

FIG. 7 shows a further embodiment of the indicator unit 1 illustrated in FIG. 2. The embodiment shown in FIG. 7 differs from the embodiment shown in FIG. 2 in that the functional unit housing 2 is formed with a portion 16 made of a material with high thermal conductivity. For example, as shown in FIG. 7, a portion 16 may be formed of a material with high thermal conductivity. Alternatively, also the entire functional unit housing 2 may be formed of a material with high thermal conductivity. Portion 16 may, for example, be formed of metal. As shown in FIG. 7, the portion 16 formed of a material with high thermal conductivity, is in the immediate surroundings of electronic carrier 5 where the electronic functional components 6, 7 are arranged and, thus, serve as the main heat sources. Thus, it is ensured that the heat generated by the functional components 6, 7 may be easily emitted to the surrounding environment of the functional unit housing 2, thereby preventing overheating of the functional components 6, 7.

In order to ensure a particularly good heat emission to the surrounding environment of the functional unit housing 2, the portion 16 made of a material with high thermal conductivity is directly adjacent to electronic carrier 5 or at least one of electronic carriers 5. As, for example, shown in FIG. 8, an additional layer with excellent heat conducting properties, e.g. a thermally conductive pad 17, that is made of an adequate adhesive, may be interposed between electronic carrier 5 and the portion 16 made of a material with high thermal conductivity, if necessary. Due to the fact that the electronic carrier 5 is immediately adjacent to the portion 16 made of a material with high thermal conductivity, and due to the thermal path constituted between the electronic carrier 5 and the portion 16 made of a material with high thermal conductivity, and with thermally conductive pads 17 arranged in between, heat may be effectively emitted to the surrounding environment of the functional unit housing 2, without having to overcome e.g. an air gap with relatively poor heat conducting properties. For this reason, as shown in FIG. 8, the thermally conductive pad 17 is immediately adjacent to the electronic carrier 5, i.e. contacts the same surface-to-surface, and, simultaneously, on the side facing away from the electronic carrier 5, it is immediately adjacent to the portion 16 made of a material with high thermal conductivity, i.e. also contacts the same on a respective surface.

As shown in the embodiment according to FIG. 8, a heat dissipation structure may be additionally provided on the outside of the portion 16 made of a material with high heat conductivity, i.e. on the side facing the surrounding environment of the functional unit housing 2. For this purpose, in FIG. 8, cooling fins 18 are formed on the outside of the portion 16 made of a material with high thermal conductivity. Any other measure increasing the surface of portion 16 may be correspondingly taken.

Alternatively, as shown in FIG. 9, a further thermally conductive pad 19 may be provided on the outside of functional unit housing 2, and directly adjacent to the portion 16 made of a material with high thermal conductivity. The thermally conductive pad 19, which is in surface contact with the portion 16 made of a material with high thermal conductivity, may be in surface contact with a heat conducting structure 20 of the system housing 14 of the system for indirect vision on the side opposed to said first surface-contact side. The heat conducting structure 20 may be an arm formed of a die-cast material, by means of which arm the functional unit housing 2 is mounted to the system housing 14.

The heat dissipation structures described in FIGS. 7, 8, and 9, which are integrated in the functional unit housing 2 for dissipating the heat generated within the functional unit housing 2 to the surrounding environment of functional housing 2, may also be applied to other functional unit housings 2 of indicator units or other functional units that are used at a vehicle outer mirror, as well as to a camera arm, or to another system for indirect vision; it is, however, not necessary that all features described in the embodiments are actually provided. In particular, the heat dissipation structures may also be used in functional unit housings where not necessarily two different electrical or electronic functional components are integrated in a common housing, one of the electrical or electronic functional components providing an indicator function.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An indicator unit for a system for indirect vision of a vehicle, comprising; an indicator housing mountable to a system housing of the system for indirect vision, having at least one electronic carrier accommodated in the indicator housing, and an optical guide accommodated in the indicator housing, the at least one electronic carrier having at least one first electric or electronic functional component and a second electric or electronic functional component;
    wherein the first functional component has a light source coupled to the optical guide as part of a direction indicator, and the second functional component provides a function other than a lighting function,
    wherein the indicator housing comprises at least one portion made of a material with high thermal conductivity and wherein the portion made of a material with high thermal conductivity is positioned directly adjacent to the electronic carrier and
    wherein a thermally conductive pad is interposed between the electronic carrier and the portion made of a material with high thermal conductivity, and wherein the electronic carrier is in surface contact with the thermally conductive pad and the thermally conductive pad is in surface contact with the portion made of a material with high thermal conductivity.

2. The indicator unit according to claim 1, wherein the first functional component and the second functional component are arranged on a common electronic carrier.

3. The indicator unit according to claim 1, wherein the electronic carrier comprises one or several further functional components.

4. The indicator unit according to claim 1, wherein the electronic carrier comprises at least one passive electric component.

5. The indicator unit according to claim 1, wherein at least one light deflecting component and/or light diffusing component, is/are provided and is/are coupled to the light source and/or the optical guide.

6. The indicator unit according to claim 1, wherein the optical guide is part of the outer surface of the indicator housing.

7. The indicator unit according to claim 1, wherein the indicator housing comprises a lens through which light emitted by the direction indicator may escape.

8. The indicator unit according to claim 6, wherein the indicator housing comprises an opening, through which opening a functional device is connectable to the second functional component, or through which the second functional component interacts with the environment.

9. The indicator unit according to claim 1, wherein the indicator housing is a closed housing.

10. The indicator unit according to claim 1, wherein the indicator housing is an open housing which forms a closed space together with a surface of the system housing by attaching to a system housing of the system for indirect vision.

11. The indicator unit according to claim 1, wherein the first and/or second functional component is/are an active functional component(s).

12. The indicator unit according to claim 1, wherein the electronic carrier directly contacts the portion made of a material with high thermal conductivity.

13. The indicator unit according to claim 1, wherein the portion made of a material with high thermal conductivity is provided with a heat dissipation structure on the side corresponding to the housing outer side of indicator housing, and wherein the heat dissipation structure is formed by cooling fins, or by a thermally conductive pad connected to a thermally conductive structure of a system housing of the system for indirect vision.

14. A system for indirect vision comprising an indicator unit according to claim 1.

15. The system for indirect vision according to claim 1, further comprising a mirroring system or a camera system.

16. The indicator unit according to claim 2, wherein at least one light deflecting component and/or light diffusing component, is/are provided and is/are coupled to the light source and/or the optical guide.

17. The indicator unit according to claim 2, wherein the optical guide is part of the outer surface of the indicator housing.

18. The indicator unit according to claim 7, wherein the indicator housing comprises an opening, through which opening a functional device is connectable to the second functional component, or through which the second functional component interacts with the environment.

19. An indicator unit for a system for indirect vision of a vehicle, comprising; an indicator housing mountable to a system housing of the system for indirect vision, having at least one electronic carrier accommodated in the indicator housing, and an optical guide accommodated in the indicator housing, the at least one electronic carrier having at least one first electric or electronic functional component and a second electric or electronic functional component;

wherein the first functional component has a light source coupled to the optical guide as part of a direction indicator, and the second functional component provides a function other than a lighting function, wherein the indicator housing comprises at least one portion made of a material with high thermal conductivity and wherein the portion made of a material with high thermal conductivity is positioned directly adjacent to the electronic carrier and wherein the portion made of a material with high thermal conductivity is provided with a heat dissipation structure on the side corresponding to the housing outer side of indicator housing, and wherein the heat dissipation structure is formed by cooling fins, or by a thermally conductive pad connected to a thermally conductive structure of a system housing of the system for indirect vision.

20. The indicator unit according to claim 19, wherein the first functional component and the second functional component are arranged on a common electronic carrier.

21. The indicator unit according to claim 19, wherein the electronic carrier comprises one or several further functional components.

22. The indicator unit according to claim 19, wherein the electronic carrier comprises at least one passive electric component.

23. The indicator unit according to claim 19, wherein at least one light deflecting component and/or light diffusing component, is/are provided and is/are coupled to the light source and/or the optical guide.

24. The indicator unit according to claim 19, wherein the optical guide is part of the outer surface of the indicator housing.

25. The indicator unit according to claim 19, wherein the indicator housing comprises a lens through which light emitted by the direction indicator may escape.

26. The indicator unit according to claim 24, wherein the indicator housing comprises an opening, through which opening a functional device is connectable to the second functional component, or through which the second functional component interacts with the environment.

27. The indicator unit according to claim 19, wherein the indicator housing is a closed housing.

28. The indicator unit according to claim 19, wherein the indicator housing is an open housing which forms a closed space together with a surface of the system housing by attaching to a system housing of the system for indirect vision.

29. The indicator unit according to claim 19, wherein the first and/or second functional component is/are an active functional component(s).

30. The indicator unit according to claim 19, wherein the electronic carrier directly contacts the portion made of a material with high thermal conductivity.

31. A system for indirect vision comprising an indicator unit according to claim 19.

32. The system for indirect vision according to claim 19, further comprising a mirroring system or a camera system.

33. The indicator unit according to claim 20, wherein at least one light deflecting component and/or light diffusing component, is/are provided and is/are coupled to the light source and/or the optical guide.

34. The indicator unit according to claim 20, wherein the optical guide is part of the outer surface of the indicator housing.

35. The indicator unit according to claim 25, wherein the indicator housing comprises an opening, through which opening a functional device is connectable to the second functional component, or through which the second functional component interacts with the environment.

* * * * *